J. J. BUKOLT.
TIGHTENING LINK.
APPLICATION FILED APR. 27, 1914.
1,136,309.
Patented Apr. 20, 1915.
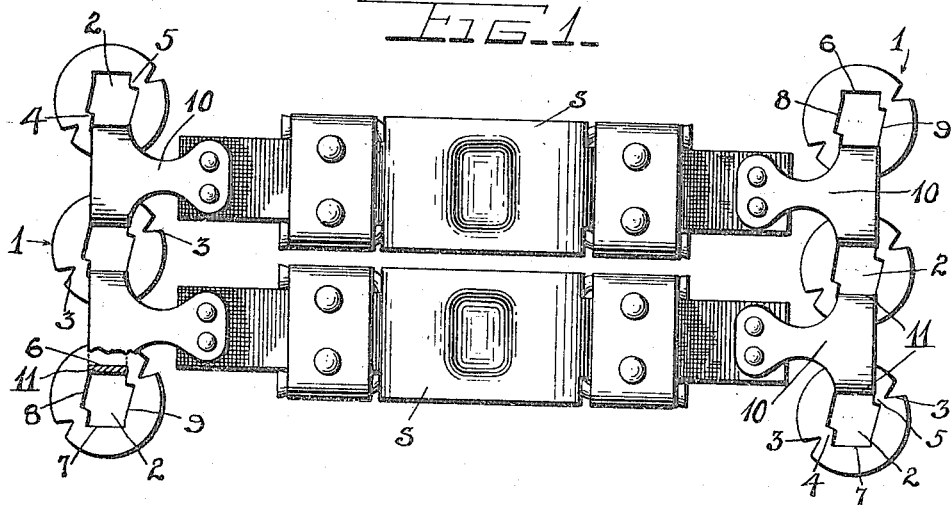
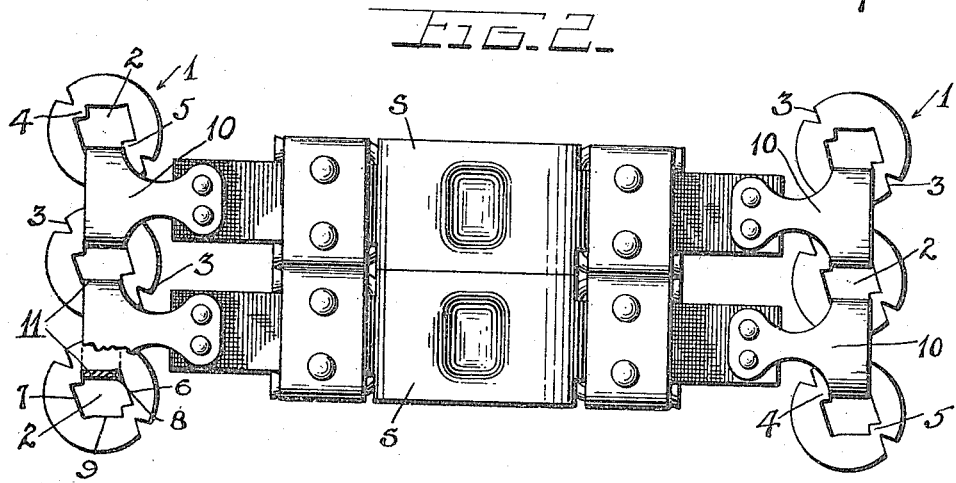
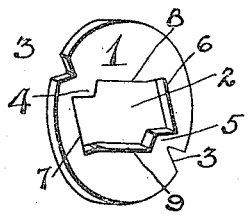
Inventor
John J. Bukolt
Witnesses

UNITED STATES PATENT OFFICE.

JOHN J. BUKOLT, OF STEVENS POINT, WISCONSIN.

TIGHTENING-LINK.

1,136,309.

Specification of Letters Patent. Patented Apr. 20, 1915.

Application filed April 27, 1914. Serial No. 834,716.

*To all whom it may concern:*

Be it known that I, JOHN J. BUKOLT, a citizen of the United States, residing at Stevens Point, in the county of Portage and State of Wisconsin, have invented certain new and useful Improvements in Tightening-Links; and I do declare the following to be a full, clear, and exact description of the invention, such as will enable others skilled in the art to which it appertains to make and use the same.

This invention relates to improvements in tightening links and more especially to connecting links for a tire armor.

The object of the invention is to provide a link of this character which is revoluble to vary the distance between it and the adjacent link to dispose the parts connected thereby closer together or farther apart as may be desired.

With this and other objects in view, the invention consists of certain novel features of construction, combination and arrangement of parts as will be more fully described and claimed.

In the accompanying drawings:—Figure 1 represents a top plan view of a portion of a tire armor equipped with these improved connecting links, with the links shown in position for disposing the armor sections their greatest distance apart; Fig. 2 is a similar view showing the links disposed to position the sections in closest proximity; and Fig. 3 is a perspective view of one of the links.

In the embodiment illustrated, these improved tightening links 1 are shown applied to a sectional tire armor as the connecting elements of the sections thereof, but it is obvious that they may be used for any other purposes for which they are adapted.

The armor shown is composed of a plurality of sections S of any suitable construction adapted to extend transversely of a tire and which are detachably connected at their terminals by these improved tightening links 1, each section being provided at its free ends with link engaging members 10. These members 10 as shown, are made in the form of heavy metal plates centrally reduced in width to lighten them and one end of which is provided with any suitable means for connecting the member to the armor section and the other end thereof has inturned oppositely disposed hooks 11 on its opposite side edges which are adapted to receive the section connecting links 1 now to be described. These links 1 are constructed as shown in detail in Fig. 3 in the form of disks each having a central aperture 2 and the periphery of which is provided with diametrically disposed notches 3. The aperture 2 of each disk is substantially in the form of a rhomboid with projections 4 and 5 extending inwardly from the remote corners thereof and in alinement with the notches 3. By forming these projections 4 and 5 at the remote corners of the rhomboidal aperture, the side walls of said recess or aperture 2 are of exactly the same length but the distance between the walls 6 and 7 is greater than that between the walls 8 and 9. These walls 6, 7, 8 and 9, are of substantially the same length as the width of the hooks 11 of the members 10 so that when said hooks are engaged with said links they are held against accidental lateral movement. Consequently it will be seen that when the hooks of adjacent sections are engaged with the walls 6 and 7 of a connecting link, said sections will be disposed a greater distance upward than when said hooks are engaged with the walls 8 and 9 which are those on the opposite sides of the rhomboidal opening, the walls 6 and 7 being at the opposite ends thereof.

The notches 3 are designed to be engaged by a suitable wrench, not shown, which is designed for turning the links 1 to bring the armor sections or other elements connected thereby, closer together or to space them farther apart from each other as may be desired. When it is desired to bring the sections closer together, the link is shifted a quarter turn which will cause the hooks of adjacent sections to engage the walls 8 and 9 at opposite sides of the rhomboidal aperture and when it is desired to space said sections farther apart, the link is given another quarter turn which will engage the hooks of adjacent sections with the walls 6 and 7 at the opposite ends of the aperture 2.

In the application of a tire armor equipped with these improved tightening links, a suitable number of sections S to encircle a tire of predetermined size are disposed side by side with their tread plates in alinement and the members 10 at the opposite ends thereof are connected by these links 1. Before this armor is applied to the tire, the tire is inflated and after the armor has been arranged thereon, it is tightened into operative position by turning or tightening up the links 1 on each side until the desired fit is obtained. After the armor has been used for a considerable length of time and the parts thereof have become worn or loosened, more links 1 may be tightened until the proper tension is obtained and should the armor become so worn that all of the links have been tightened to their utmost, these links may be loosened and one section of the armor taken out and the adjacent sections connected again and the links tightened up whereby the proper fit of the armor will be insured.

I claim:

1. An adjusting link comprising a circular disk having a rhomboidal shaped aperture therein having notches cut in the longer sides to define two parallel sides of length equal to the shorter sides of the rhomboid and which are closer together than said shorter sides of the rhomboid.

2. Adjusting links adapted to engage elements having hooks, each link having a rhomboidal shaped aperture adapted to engage said hooks, said link being rotatable to adapt the longer and shorter sides of said aperture to engage said hooks to space the elements varying distances apart.

3. An adjusting link having a rhomboidal shaped aperture therein.

In testimony whereof I have hereunto set my hand in presence of two subscribing witnesses.

JOHN J. BUKOLT.

Witnesses:
 JOHN G. GLINSKI,
 WM. J. EIDEN.

Copies of this patent may be obtained for five cents each, by addressing the "Commissioner of Patents, Washington, D. C."